(12) United States Patent
Huang et al.

(10) Patent No.: US 10,880,829 B2
(45) Date of Patent: Dec. 29, 2020

(54) SYSTEM AND METHOD FOR USER EQUIPMENT NETWORK CAPABILITY CONTROL IN RADIO ACCESS NETWORKS

(71) Applicant: Verizon Patent and Licensing Inc., Arlington, VA (US)

(72) Inventors: Ye Huang, San Ramon, CA (US); Arvind Aggarwal, San Ramon, CA (US); Miguel A. Carames, Long Valley, NJ (US); Martin A. Iroff, Alpharetta, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/352,912

(22) Filed: Mar. 14, 2019

(65) Prior Publication Data
US 2020/0296665 A1    Sep. 17, 2020

(51) Int. Cl.
*H04W 52/02*    (2009.01)
*H04W 4/70*    (2018.01)
*H04W 76/28*    (2018.01)

(52) U.S. Cl.
CPC ........ *H04W 52/0209* (2013.01); *H04W 4/70* (2018.02); *H04W 76/28* (2018.02)

(58) Field of Classification Search
CPC ....... H04W 4/70; H04W 76/28; H04W 76/38; H04W 60/04; Y02D 70/00; Y02D 70/21; Y02D 70/142; Y02D 70/24; H04L 69/24
See application file for complete search history.

(56) References Cited

U.S. PATENT DOCUMENTS

| | | | | |
|---|---|---|---|---|
| 2018/0324652 A1* | 11/2018 | Ryu | ................ | H04W 8/04 |
| 2019/0349858 A1* | 11/2019 | Jantzi | ................ | G06F 1/3209 |
| 2019/0373441 A1* | 12/2019 | Ryu | ................ | H04W 68/005 |
| 2020/0037391 A1* | 1/2020 | Cui | ................ | H04W 8/02 |

* cited by examiner

*Primary Examiner* — Elton Williams (57) ABSTRACT

Systems provide for provisioning, in a wireless network, in a network-service profile associated with a network-service subscriber, at least one of a power saving mode (PSM) parameter or an extended discontinuous reception (eDRX) parameter for use by a first user device; receiving a network service-related request from the first user device via an administrative non-IP packet data network (PDN) bearer established using a statically-allocated non-IP administrative access point name (APN); sending, via the PDN bearer, a first mobile terminated trigger delivery request (MT-TDR) including a bootstrap request trigger, generated by the network device, to the first user device; receiving, via the PDN bearer in response to the bootstrap request trigger, a first mobile originated originating delivery request (MO-ODR) bootstrap request; and sending, in response to the bootstrap request, a second MT-TDR including the at least one of the PSM parameter or the eDRX parameter.

20 Claims, 8 Drawing Sheets

SYSTEM AND METHOD FOR USER EQUIPMENT NETWORK CAPABILITY CONTROL IN RADIO ACCESS NETWORKS

BACKGROUND

Power Saving Mode (PSM) and extended Discontinuous Reception (eDRX) are power-saving functions supported by already-deployed radio access networks (RANs), which leverage mobility features of cellular, narrowband Internet-of-Things (NB-IoT) and machine-to-machine (M2M) technology. PSM enables NB-IoT/M2M user equipment (UE) to enter a non-communicative mode for configurable periods of time after notifying a base station. eDRX allows UEs to have longer sleep periods between a UE's paging cycles.

PSM and eDRX functionalities reduce power consumption associated with higher-energy processing states (e.g., messaging) of in-field UE. Thus, eDRX and PSM form a key part of the power-saving strategy for battery-powered UE and provide other significant technological advantages in terms of reducing the number of network access requests generated per connected UE in a particular service area (e.g., a single cell) for applications such as asset tracking, smart meters, environment sensors, etc. Eliminating unnecessary network traffic avoids the occurrences of overloading in the 4G and 5G wireless networks, for example, servicing the UE.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

PSM refers to UE status that is similar to power-off, but the UE remains registered with the network without need to re-attach or re-establish packet data network (PDN) connections. A UE in PSM (sometimes referred to as a "PSM UE") may not be immediately reachable for mobile terminating services. A PSM UE is only available for mobile terminating services during the time it is in transmit mode and for a subsequent period of an "active time" (e.g., about 5, 10, 20, or 30 secs.). The transmit mode is triggered by a prescheduled wake-up (e.g., in accordance with a periodic tracking area update (TAU) procedure) and/or a mobile-originated event, such as an initial attach, data transfer, etc.

eDRX allows the UE customer and/or a service network to determine how long (e.g., how many "hyper frame" intervals of about 10.24 seconds) the UE plans to sleep ("idle cycle") before checking back in with the network during a configurable paging time window (PTW). The maximum interval a UE can sleep may be configured by the network service operator. A maximum eDRX idle cycle may be, for example, twenty-four hours. The PTW value may be on the order of seconds, for example, about 5, 10, or 20 secs.

Under current approaches to PSM and eDRX implementation, a UE's network capability parameters (e.g., timer values) are determined and requested by the UE device during network attachment, for example, but the requested timer values are subject to being overridden by the service network. However, controlling UEs' network capabilities (e.g., PSM and/or eDRX) according to a schedule that is coordinated between the UE and a service network presents significant technological challenges. For example, misconfigured timer values result in UE device function issues (e.g., PSM and/or eDRX not enabled), and in excessive network traffic due to nonoptimal timer values (e.g., too short or too long). In addition, some UE customers experience a parameter setting procedure that is overly-complex. Currently, there is no standardized or acceptable methodology used by network operators to perform automation of parameter-setting. A singular approach to implement a network-wide parameter setting for a customer may not accommodate the customer who has varied application demands. Another challenge facing service network providers, is the ability to trouble-shoot customer issues related to command and control signaling and/or data reporting with UE.

According to exemplary embodiments, PSM and eDRX services are described herein. According to exemplary embodiments, the PSM and eDRX services may be implemented for idle mode and/or connected mode of an end device. According to an exemplary embodiment, a network device stores PSM and/or eDRX data as a part of subscription data and/or UE profile data (referred to herein simply as "service profile data") pertaining to the management and communications with the UE. For example, the network device may be a device that stores service profile data created during enterprise onboarding (e.g., account setup). According to an exemplary embodiment, the PSM and/or eDRX data is obtained and used by another network device to control PSM and/or eDRX performed by the UE. For example, the other network device may be implemented as a device controller function module within a service capability exposure function (SCEF) and/or a network exposure function (NEF), an Internet of things (IoT) enablement platform (IEP), or other network device/element that is configured to manage PSM and/or eDRX with the UE.

According to an exemplary embodiment, the other network device may obtain the PSM and/or eDRX data during an attachment procedure and/or a re-attachment procedure between the UE and a wireless network. The PSM and/or eDRX data can be customized per subscriber and/or the service operator's defined profile templates that are created based on the subscriber's UE network traffic models. For example, one profile may have a six-hour sleep time and another profile may have a one hour sleep time for PSM-enabled UE.

According to an exemplary embodiment, the network device may provide PSM and/or eDRX timer values to the UE during the attachment procedure and/or during other procedures that may occur subsequent to attachment. For example, the network device may provide the PSM and/or eDRX timer values to the UE during a periodic tracking area update (TAU) procedure/routing area update (RAU) procedure, or as a part (e.g., wholly or partially) of some other procedure that may occur when a change is made to PSM and/or eDRX values post-attachment.

According to exemplary embodiments, the PSM and/or eDRX data service profiles may be automatically provisioned on an individual basis (e.g., per UE device) and/or a per application type basis (e.g., per Access Point Name (APN)), for example, to an entire fleet of a subscriber's UEs. According to an exemplary embodiment, UE devices may boot up with a default, statically-allocated non-IP admin APN that is stored in a subscriber identity module (SIM) or another type of card executed by the UE.

According to an exemplary embodiment, the PSM and/or eDRX data may be implemented as a flag or other type of data that indicates the UE is to be provided with a new and/or different PSM and/or eDRX timer value. PSM and/or eDRX timer values may be based on different types of a subscriber's UEs. For example, timer values may include a particular timer value for narrowband Internet of things (NB-IoT) devices, another timer value for enhanced Machine Type Communication (eMTC) devices (also known as Cat-M1), and one or multiple other timer values for other categories/types of UEs (e.g., a category 1 or above LTE device, etc.). Additionally, or alternatively, the timer values may be based on different types of radio access networks (RANs). For example, timer values may include PSM and/or eDRX timer values corresponding to various RANs, such as Third Generation (3G), 3.5G, Fourth Generation (4G), 4.5G, Fifth Generation (5G), and so forth. Additionally, or alternatively, the timer values may be based on application types. For example, the timer values may include PSM and/or eDRX timer values corresponding to various types of applications (e.g., real-time, non-real-time, MTC application, non-MTC application, end user application, urgent (e.g., medical application), delay-tolerant, non-delay tolerant, etc.), or other types of nomenclatures directed to application types. Additionally, or alternatively, the timer values may be some combination of the above. In this way, the timer values may have a finer granularity corresponding to the capabilities and operation of the UE, and in turn, may improve operational (e.g., battery life, etc.) and communicative functionalities (e.g., transmission and reception of data) at the UE, and correspondingly improve wireless service.

According to an exemplary embodiment, the service profile data may indicate to use particular timer values based on subscriber identifiers. The subscriber-based timer value may be based on the type of UE, the type of RAN, the type of application, or some combination thereof. In this way, the network may reduce resource utilization and the UE may be provided with an a PSM and/or timer value that has been pre-configured for the UE in view of the functional and operational characteristics associated with the UE and/or the wireless network.

According to an exemplary embodiment, the service profile data may indicate to use a timer value corresponding to a pre-defined or standardized timer value, for example, adopted by a governing entity (e.g., 3GPP, International Telecommunication Union (ITU), etc.) in relation to a wireless network architecture (e.g., LTE, LTE-A, 5G, etc.) or a value disclosed in a technical specification. According to another exemplary implementation, the timer value may not correspond to a standardized timer value.

According to an exemplary embodiment, the network service may use non-standard objects and/or resources to be created as an extension of the light weight M2M (LWM2M) client or standalone client for server-initiated bootstrap for service profile download and network capability resources using the standard schema. According to another embodiment, an extension model for the network capability parameters, such as a low access priority indicator (LAPI), may be added to a service profile as part of a subscription package that compensates for throttled bandwidth, for example, during certain network congestion conditions. According to another embodiment, the network service may support multiple device controllers in different network devices, such as the SCEF/NEF and/or the network enablement platform.

As a result of the foregoing, the PSM and eDRX services may offer greater versatility and control of PSM and/or eDRX timer values, which in turn may improve the usable life of the end device, and may reduce network resource utilization.

Figure 1:
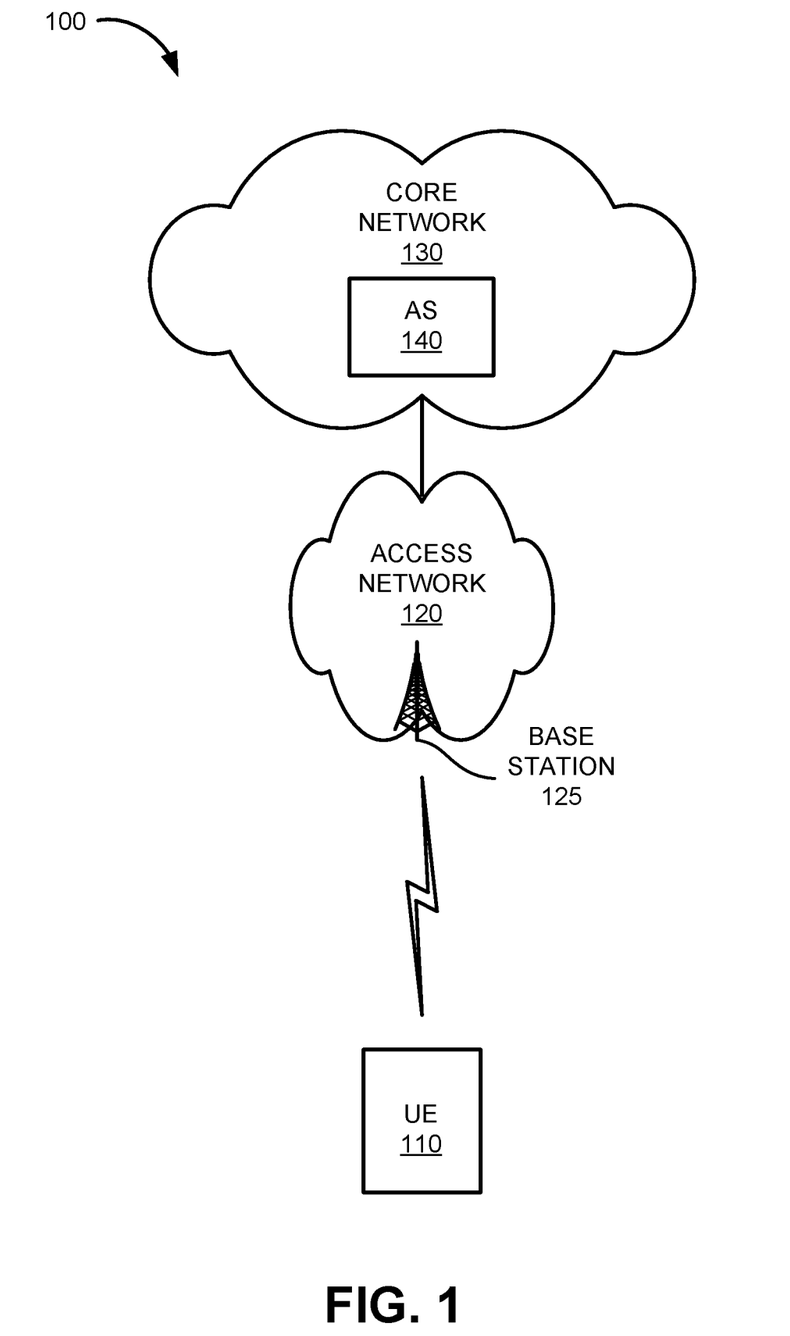
FIG. 1 is a diagram illustrating an exemplary environment in which an exemplary embodiment of eDRX and/or PSM services may be implemented.

FIG. 1 is a diagram of an exemplary environment 100 in which the systems and/or methods, described herein, may be implemented. As illustrated, environment 100 may include an end device or UE device 110, an access network 120, and a core network 130.

UE device 110 (also referred to herein as "wireless device") may include a device that has computational and wireless communication capabilities, and includes logic that supports the PSM and eDRX services, as described herein. UE device 110 may be implemented as a mobile device, a portable device, a stationary device (e.g., a non-mobile device), a device operated by a user, or a device not operated by a user. In some implementations, UE device 110 may include an IoT device enabled with wireless communication functionality and employing M2M communication. UE device 110 may be configured to use eDRX and/or PSM. In some implementations, the M2M communication may include Machine-Type Communication (MTC), a type of M2M communication standard developed by 3GPP. In other implementations, the M2M communication may include a different type of communication not tied to a particular standard.

For example, UE device 110 may include an embedded wireless MTC device that communicates wirelessly with other devices over an M2M interface, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary, low data rate MTC device (e.g., parking meter), a stationary high data rate MTC device (e.g., a camera providing a video feed), an MTC device moving at pedestrian speeds (e.g., a health monitoring device attached to a user), an MTC device moving at vehicular speed (e.g., a vehicle telematics device), and/or another type of MTC device.

In other implementations, UE device 110 may include a non-IoT/M2M wireless device that employs eDRX and/or PSM. For example, UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface.

Access network 120 may provide access to core network 130 for wireless devices, such as UE device 110. Access network 120 may enable UE device 110 to connect to core network 130 for mobile telephone service, Short Message Service (SMS) message service, Multimedia Message Service (MMS) message service, Internet access, cloud computing, and/or other types of data services.

Access network 120 may establish a PDN connection between UE device 110 and core network 130 via one or more Access Point Names (APNs). In some implementations, access network 120 may include a RAN based on the LTE standard. In other implementations, access network 120 may include a Code Division Multiple Access (CDMA) access network. For example, the CDMA access network may include a CDMA enhanced High Rate Packet Data (eHRPD) network (which may provide access to an LTE access network).

In other implementations, access network 120 may include an LTE Advanced (LTE-A) access network and/or any other advanced network, such as a 5G access network that includes functionality such as carrier aggregation; advanced or massive multiple-input and multiple-output (MIMO) configurations; cooperative MIMO (CO-MIMO); relay stations; heterogeneous networks of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access network 120 may include a base station 125, and UE device 110 may wirelessly communicate with access network 120 via base station 125 when UE device 110 is located within the geographic area serviced by base station 125. Base station 125 may be part of an LTE eNodeB (eNB) base station device or next generation NB (gNB). An eNB/gNB base station device may use the Evolved Universal Terrestrial Radio Access (E-UTRA) air interface to wirelessly communicate with devices. An eNB/gNB base station device may include one or more devices (e.g., base stations 125) and other components and functionality that allow UE device 110 to wirelessly connect to access network 120. The eNB/gNB base station device may include or be associated with one or more cells. For example, each cell may include an RF transceiver facing a particular direction. The eNB/gNB base station device may correspond to a macrocell or to a small cell (e.g., a femtocell, a picocell, a microcell, etc.).

Core network 130 may include an optical core network, a CDMA core network, a general packet radio service (GPRS) core network, an LTE core network, or a combination of networks. Core network 130 may allow the delivery of IP services to UE device 110, and may interface with other external networks. Core network 130 may include one or more server devices and/or network devices, or other types of computation or communication devices. In some implementations, core network 130 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

According to an implementation, core network 130 may include an application server (AS) device 140. AS device 140 (referred to hereafter simply as "AS 140") may include one or more devices, such as computer devices and/or server devices, which are configured to communicate with UE device 110. AS 140 may solicit, receive, and process MTC data from UE 110. In other implementations, AS 140 may be located outside of core network 130. For example, AS 140 may be located inside a private network (not shown in FIG. 1) or another type of network that is external from core network 130 but connected to core network 130.

Although FIG. 1 shows exemplary components of environment 100, in other implementations, environment 100 may include fewer components, different components, differently-arranged components, or additional functional components than depicted in FIG. 1. Additionally or alternatively, one or more components of environment 100 may perform functions described as being performed by one or more other components of environment 100. A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

Figure 2:
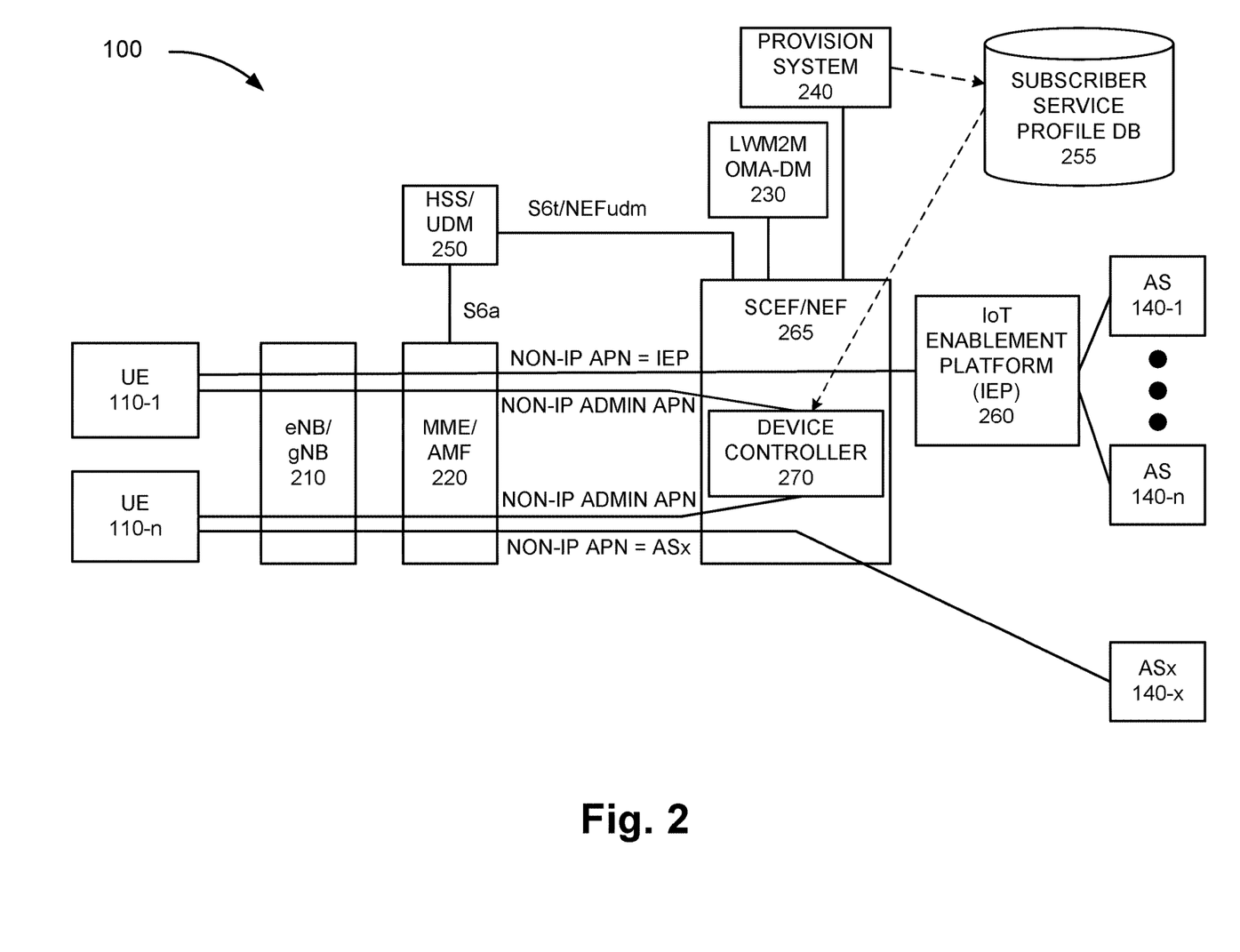
FIG. 2 is a diagram illustrating exemplary components of the access network within the environment of FIG. 1.

FIG. 2 is a diagram illustrating exemplary components of access network 120, core network 130, and other components within environment 100 according to an implementation described herein. As shown in FIG. 2, access network 120 and/or core network 130 may correspond to a 4G or 5G access network and may include devices that implement logical entities interconnected via interfaces, and that provide wireless packet-switched services and wireless IP connectivity to user devices for both data and voice services. Access network 120 and/or core network 130 may include an eNB/gNB 210 (corresponding to base station 125), a mobility management entity (MME)/access and mobility management function (AMF) device 220, a lightweight M2M Open Mobile Alliance-device manager (LWM2M OMA-DM) 230, provision systems 240, a home subscriber server (HSS)/unified database management (UDM) device 250, a subscriber service profile database (DB) 255, an IoT enablement platform (IEP) 260, and a service capability exposure function (SCEF)/network exposure function (NEF) device 265.

One or more devices in access network 120 and/or core network 130 may interface with AS 140 and/or a device controller function module ("device controller") 270. Although FIG. 2 shows AS 140 located within core network 130, in other implementations, AS 140 may be located outside core network 130. For example, AS 140 may be located in a private network, an IMS network, or as a standalone device. Although FIG. 2 shows device controller 270 located within SCEF/NEF 265, in other implementations, device controller 270 may be located outside SCEF/NEF 265. For example, device controller 270 may be located in IEP 260 or as a standalone device. Although FIG. 2 depicts a single eNB/gNB 210, MME/AMF device 220, LWM2M OMA-DM 230, provision system 240, HSS/UDM device 250, DB 255, IEP 260, SCEF/NEF 265, and device controller 270 for illustration purposes, in practice, environment 100 may include multiple eNBs/gNBs 210, MMEs/AMFs device 220, LWM2M OMA-DMs 230, provision systems 240, HSSs/UDMs 250, DBs 255, IEPs 260, SCEFs/NEFs 265, and device controllers 270 eNB/gNB 210 may include one or more devices (e.g., base stations) and other components and functionality that allow UE device 110 to wirelessly connect to access network 120 (e.g., base station 125). eNB/gNB 210 may include or be associated with one or more cells that each include a radio frequency (RF) transceiver. eNB/gNB 210 may interface with access network 120 via an interface referred to as an S1 interface, which may be split into a control plane S1-MME/AMF interface and a data plane S1-U interface. The S1-MME/AMF interface may interface with MME/AMF 220. The S1-MME/AMF interface may be implemented, for example, with a protocol stack that includes a Network Access Server (NAS) protocol and/or Stream Control Transmission Protocol (SCTP).

MME/AMF device 220 (referred to hereafter simply as "MME/AMF 220") may implement control plane processing for access network 120 and/or core network 130. For example, MME/AMF 220 may implement tracking and paging procedures for UE device 110, may activate and deactivate bearers for UE device 110, may authenticate a user of UE device 110, and may interface to non-LTE/5G radio access networks. A bearer may represent a logical channel with particular quality of service (QoS) requirements. MME/AMF 220 may also select a particular SCEF/NEF 265 for a particular UE device 110. A particular MME/AMF 220 may interface with SCEF/NEF 265 via a Non-IP APN via a packet data network (PDN) connection. According to an implementation described further herein, MME/AMF 220 may authorize UE device 110 for non-IP data delivery (NIDD). According to another implementation described further herein, MME/AMF 220 creates a management request using a UE-ID, a non-IP admin APN, and a bearer-ID.

LWM2M 230 may include communication/control interface logic exchange command and control signals with UE 110, for example, for implementing device configuration operations according to the signals, based on reporting data received from UE 110. LWM2M 230 may interface with SCEF/NEF 265, for example.

Provision system 240 may function to provision UEs 110 associated a particular AS 140 with UE network capability parameters, such as eDRX and PSM values. In one embodiment, provision system 240 may determine eDRX and/or PSM values for UE 110 using information obtained from a customer account profile in DB 255 which is associated with a particular AS 140.

HSS/UDM device 250 (referred to hereafter simply as "HSS/UDM 250") may store information associated with UEs 110 and/or information associated with users of UE 110. For example, HSS 250 may store subscription profiles that include authentication and access authorization information. Each subscription profile may include a list of UEs 110 associated with the subscription as well as an indication of which UE device 110 is authorized to connect to access network 120 and/or core network 130. HSS/UDM 250 may communicate with MME/AMF 220 through an S6a interface. The S6a interface may be implemented, for example, using a Diameter protocol. HSS/UDM 250 may interface with SCEF/NEF 265 through an S6t or an NEFudm interface, respectively.

Database device 255 (referred to hereafter simply as "DB 255") may store subscriber information relating to UE network capability profiles. For example, DB 255 may obtain information identifying which UE devices 110 are associated with which ASs 140 from provision system 240, for example, during the onboarding process. Furthermore, DB 255 may provide information identifying network capability parameters, such as eDRX values (e.g., IdleCycle Timer, PTW, etc.) and/or PSM values (e.g., TAU, Active Timer, etc.).

IEP device 260 (referred to hereafter simply as "IEP 260") may interface with ASs 140 and with SCEF/NEF 265. For example, each IEP 260 may aggregate command and control signaling and/or data reporting for all UEs 110 associated with a particular AS 140 and/or a particular client or client application. In some embodiments, UEs 110-$n$ may be associated with ASx 140-$x$ through a bearer path that does not include IEP 260.

SCEF/NEF device 265 (referred to hereafter simply as "SCEF/NEF 265") may include a network or computational device that provides the capability for the creation, verification, and testing of MTC services. In one implementation, SCEF/NEF 265 may exchange control plane signaling with MME/AMF 220 (via a T6a interface using Diameter protocol) and/or HSS/UDM 250 (via an Sh or S6t interface or NEFudm interface). In one implementation, SCEF/NEF 265 may be included as part of a control plane bearer path between UE device 110 and AS 140. According to an implementation described herein, SCEF/NEF 265 may act as a gateway for connecting UE device 110 to AS 140. Generally, SCEF/CEF 265 may expose application-programming interfaces (APIs) for multiple application servers (such as AS 140) to access network services to communicate with UEs 110. UE 110 sets up a non-IP PDN connection towards SCEF/NEF 265, and SCEF/NEF 265 will have connectivity towards AS 140, as shown in FIG. 2. In this way, SCEF/NEF 265 may facilitate communication between UE 110 and AS 140.

As described further herein, SCEF/NEF 265 may communicate with MME/AMF 220 via a modified T6a interface relative to a standardized T6a interface. The modified T6a may support the transmission and reception of messages that support the PSM and/or eDRX services, as described herein. For example, the modified T6a interface may support mobile-terminated trigger-data requests (MT TDRs) and mobile-originated originated-data requests (MO ODRs) for configuring network capability parameter extension. For example, the MT TDR is enhanced to allow SCEF/NEF 265 to execute network-capability-object (bootstrap-request trigger) with respect to UE 110. Also, the MO ODR is enhanced to allow UE 110 a bootstrap-request to indicate to SCEF/NEF 265 one or more of the following: a TAU value, an Active Timer value, an IdleCycle Timer value, a PTW value, etc. Messages transmitted and/or received via the modified T6a interface may use information elements (IEs), attribute value pairs (AVPs), and/or other types of data elements to carry various data instances in support of the PSM and/or eDRX services, as described herein.

Device controller device 270 (referred to hereafter simply as "device controller 270") may generate the MT TDRs in response to trigger UE capability profile downloads directed by SCEF/NEF 265. In one embodiment, SCEF/NEF 265 may direct operations to device controller 270 based on an identified destination port. Additionally, device controller 270 may perform account setup, UE capability profile creation and/or update. As described further herein, device controller 270 may set account/AS/UE capability data in response to a setup or update, and provide the data to SCEF/NEF 265. For example, device controller 270 may change a flag or other instance of data to indicate a value (e.g., "true") in response to setup and/or update, and provide the flag or other instance of data to SCEF/NEF 265.

Although FIG. 2 shows exemplary components of access network 120 and/or core network 130, in other implementations, access network 120 and/or core network 130 may include fewer components, different components, differently arranged components, or additional components than depicted in FIG. 2. Additionally or alternatively, one or more components of access network 120 and/or core network 130 may perform functions described as being performed by one or more other components of access network 120 and/or core network 130.

Figure 3:
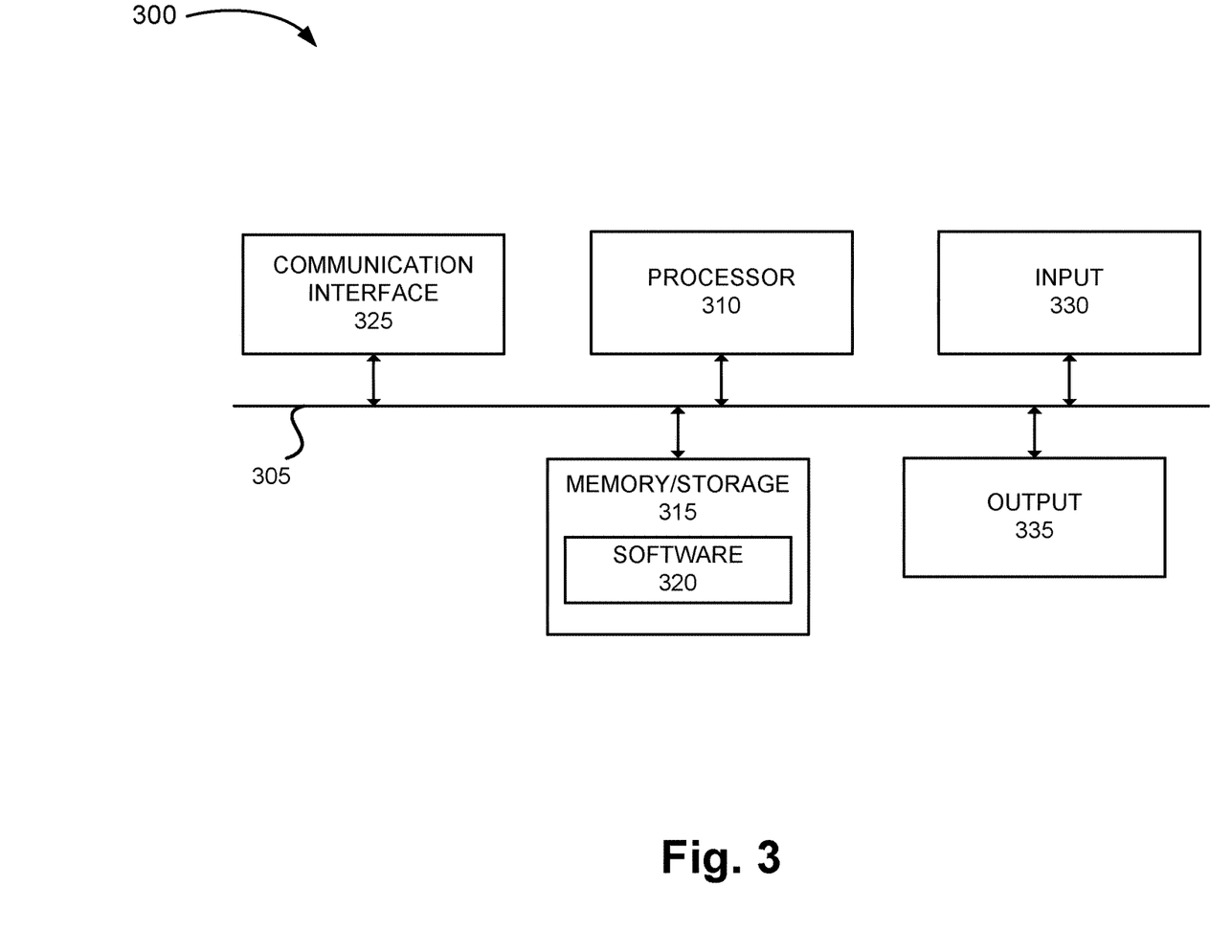
FIG. 3 is a diagram illustrating exemplary components of a device that may correspond to one or more of the devices illustrated in FIG. 2.

FIG. 3 is a diagram illustrating exemplary components of a device 300 that may correspond to one or more of the devices described herein. For example, device 300 may correspond to components included in network devices of UE 110, access network 120, core network 130, and/or AS 140. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 400. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, graphical processing units (GPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to device controller 270, software 320 may include an application that, when executed by processor 310, provides the functions of the eDRX and/or PSM services, as described herein. Similarly, UE 110, AS 140, and other network devices may each include an application that, when executed by processor 310, provides the functions of the eDRX and/or PSM services, as described herein. Software 320 may also include firmware, middleware, microcode, hardware description language (HDL), and/or other form of instruction. Software 320 may further include an operating system (OS) (e.g., Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, etc.). Additionally, as previously described, in contrast to an existing configuration/standard of the T6a interface, the T6a interface as described herein supports the eDRX and/or PSM services. For example, the T6a interface provides for the communication via a statically-allocated non-IP APN connections from device controller 270 to UE 110. Further, other interfaces may be contrasting to existing configurations/standards in view their support of the eDRX and/or PSM services, as described herein.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
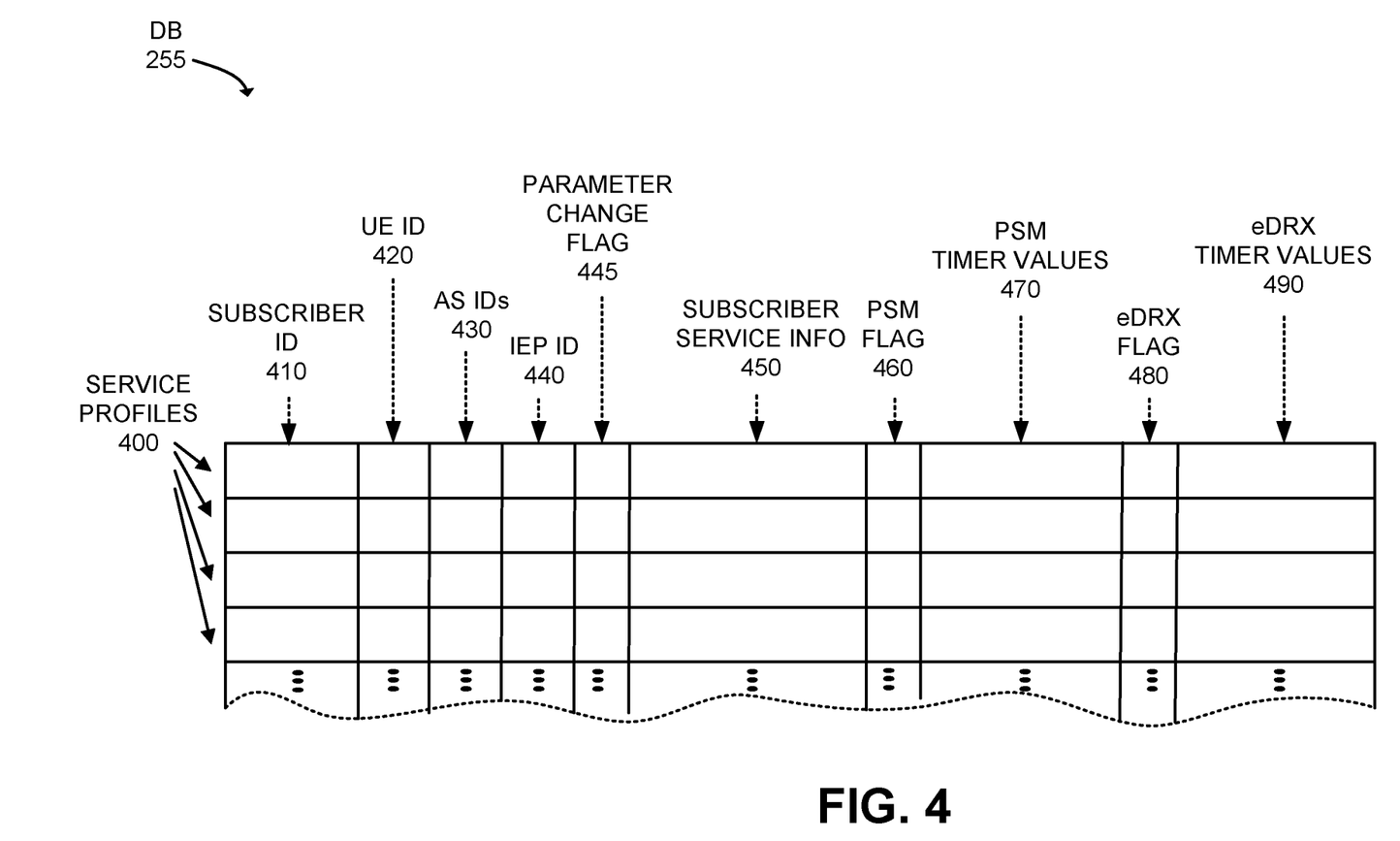
FIG. 4 is a diagram that depicts an exemplary implementation of a data structure stored in the database of FIG. 2.

FIG. 4 is a diagram that depicts an exemplary implementation of a data structure stored in DB 255. As shown, a data structure of DB 255 may store multiple service profiles (or "records") 400, with each service profile 400 including a subscriber identifier (ID) field 410, a UE ID field 420, an AS IDs field 430, an IEP ID field 440, a parameter change field 445, a subscriber service information field 450, a PSM flag field 460, a PSM timer values field 470, an eDRX flag field 480, and an eDRX timer values field 490. The data structure of DB 255 may be stored within a memory/storage 315 of a network device 300. Each service profile 400 shown in FIG. 4 corresponds to a subscriber onboarded by the service network.

Subscriber identifier (ID) field 410 stores a unique ID for a particular subscriber that subscribes to a network service. The unique ID of the subscriber may include any type of alphanumeric ID, or other type of ID, that uniquely identifies the subscriber among multiple other subscribers. UE ID field 420 stores a unique identifier (e.g., a globally unique ID (GUID)) for respective UEs 110 to which service profiles 400 are directed. Any type of unique identifier may be assigned to particular UEs 110 and used for identification purposes. For example, UE ID field 420 may store an International Mobile Subscriber Identity (IMSI) and/or Mobile Directory Number (MDN) for UE 110 of service profile 400. AS IDs field 430 stores a unique identifier for one or more AS associated with UEs 110. IEP ID field 440 stores a unique identifier for IEP 260 associated with UEs 110. Parameter change field 445, when set, indicates that that one or more UE network capability parameters have been updated for UE 110. Parameter change field 445 may be reset when UE 110 has been configured/re-configured with the new timer values. Subscriber service information field 450 stores information related to providing the network service(s) via network(s) 120/130, to which the subscriber identified in field 410 has subscribed, to UE 110. For example, subscriber service info may include account information, subscriber traffic models that correspond to observed traffic related to UEs 110, etc.

PSM flag field 460 stores a flag that, when set, indicates that the UE identified in field 420 of the subscriber identified in field 410 is enabled for PSM functionality. PSM timer values field 470 stores PSM timer values that, when the flag in field 460 is set, are to be used for controlling a PSM of UE 110 identified in field 420. The PSM timer values stored in field 470 may include, for example, a TAU value and/or an active timer value.

eDRX flag field 480 stores a flag that, when set, indicates that UE 110 identified in field 420 of the subscriber identified in field 410 is enabled for eDRX functionality. eDRX timer values field 490 stores eDRX timer values that, when the flag in field 480 is set, are to be used for controlling an eDRX of UE 110 identified in field 420. The eDRX timer values stored in field 490 may include, for example, an IdleCycle timer value and/or a PTW value.

To locate a particular service profile 400 within DB 255, DB 255 may be queried with, for example, a subscriber ID, a UE ID, and/or an APN ID to locate a service profile 400 having a matching subscriber ID stored in field 410, a matching UE ID stored in field 420, and/or a matching APN ID stored in field 430. When corresponding service profile 400 is located, data may be written to one or more fields 430, 440, 450, 460, 470, 480, and/or 490, or data may be retrieved from one or more fields 430, 440, 450, 460, 470, 480, and/or 490. Other fields of a service profile 400, instead of subscriber ID field 405, UE ID field 410, or subscriber service info field 450 may alternatively be used for querying DB 255.

DB 255 is depicted in FIG. 4 as including a tabular data structure with each data structure having a certain number of fields having certain content. The tabular data structure of DB 255 shown in FIG. 4, however, is for illustrative purposes. Other types of data structures may alternatively be used. The number, types, and content of the entries and/or fields in the data structure of DB 255 illustrated in FIG. 4 is also for illustrative purposes. Other data structures having different numbers of, types of and/or content of, the entries and/or the fields may be implemented. Therefore, DB 255 may each include additional, fewer and/or different entries and/or fields than those depicted in FIG. 4.

Figure 5:
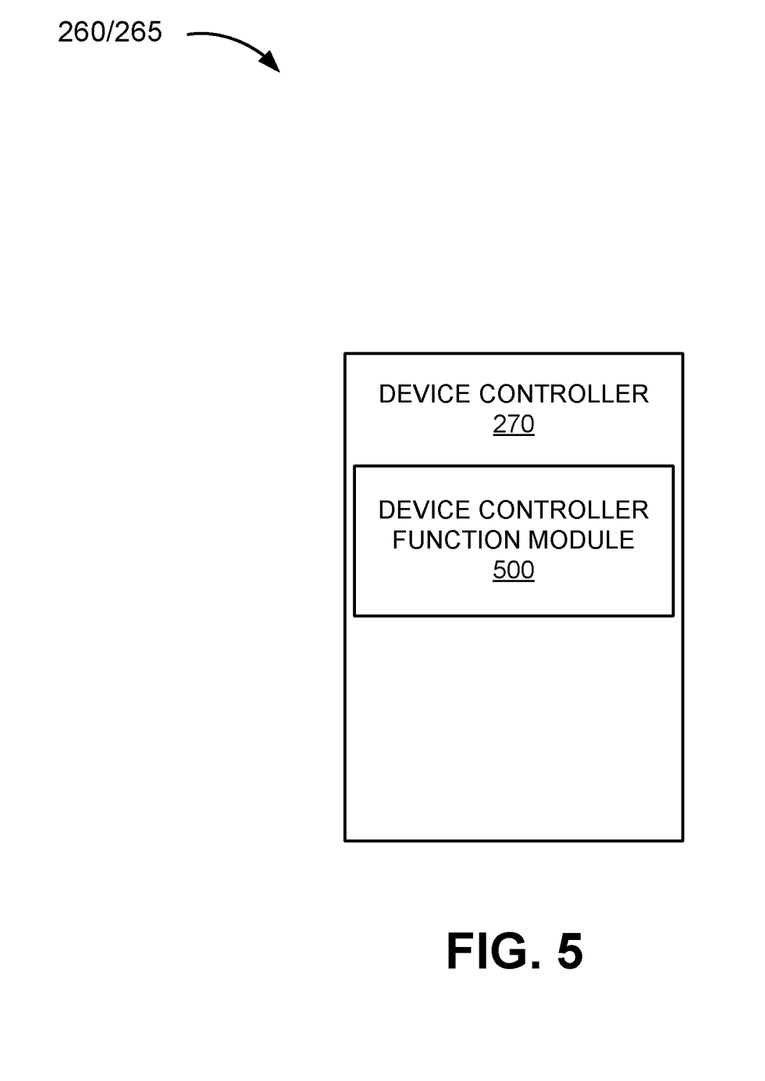
FIG. 5 is a block diagram illustrating exemplary logical components of a device controller of FIG. 2.

FIG. 5 is a block diagram illustrating exemplary logical components of device controller 270 that may reside in SCEF/NEF 265 and/or IEP 260. The functions described in connection with FIG. 5 may be performed by one or more components of device 300 (FIG. 3). The logical block of FIG. 5 may be included, for example, in an application (e.g., software), stored in memory/storage 315 and executed by processor 310. As shown in FIG. 5, device controller 270 may include device controller function module 500 that allows service network operators to manage UE network capability parameter provisioning, as described herein. Other configurations may be implemented. Therefore, device controller 270 may include additional and/or different logical components than those depicted in FIG. 5.

Figure 6A:
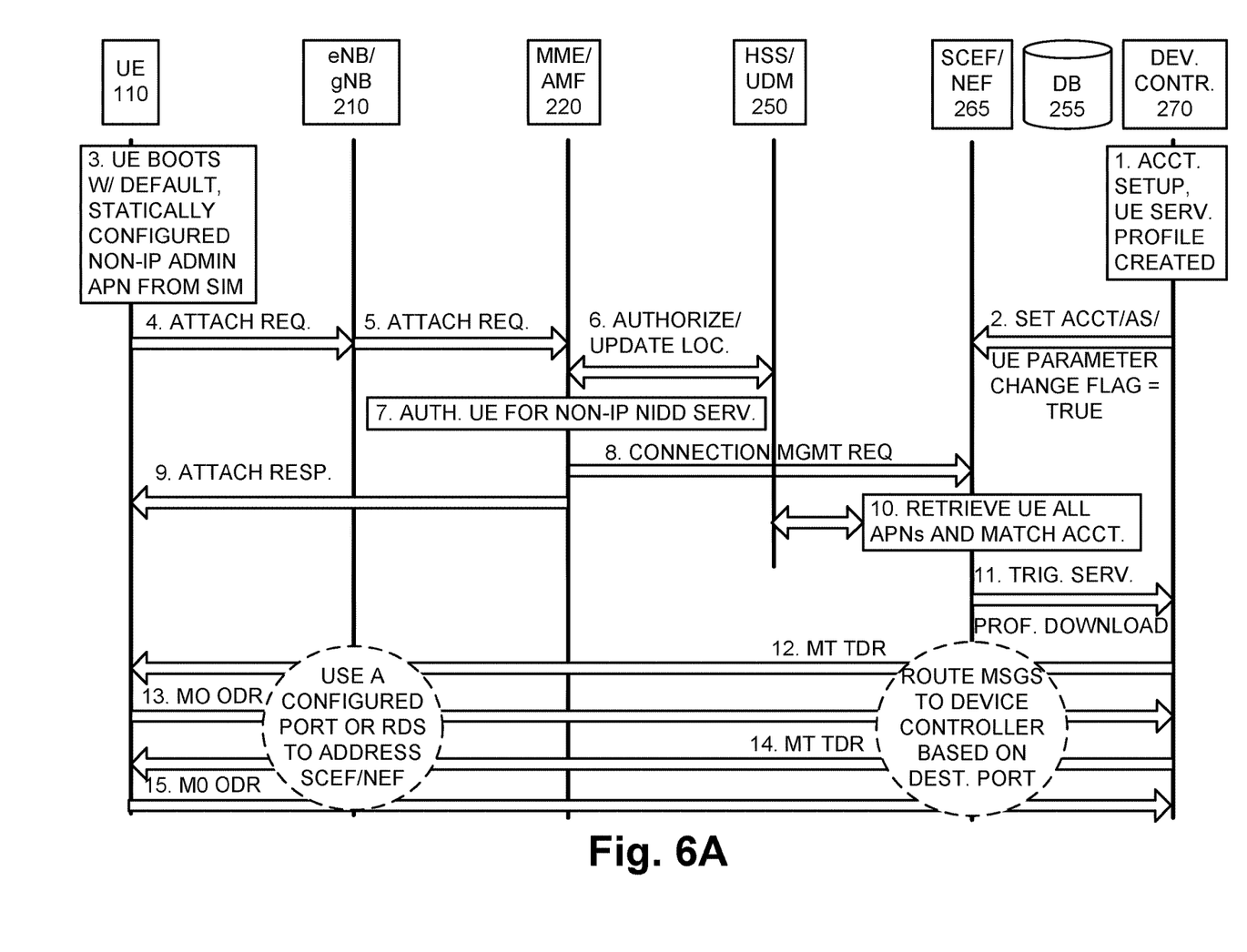
FIG. 6A is a diagram illustrating an exemplary process of the PSM and/or eDRX services included in an exemplary attachment procedure.

FIG. 6A is a diagram illustrating an exemplary process of the PSM and/or eDRX services related to an attachment procedure. The messages illustrated and described are exemplary, and do not represent an entirety of the messages that may be exchanged among the various devices. For example, a random access procedure, which is not illustrated in FIG. 6A, may take place before a radio resource control (RRC) connection establishment procedure. Additionally, for example, various messages may be exchanged to establish a bearer connection. Also, a message may include other data (e.g., information elements (IEs), etc.) not specifically described herein.

Referring to FIG. 6A, device controller 270, during onboarding of a subscriber, sets up an account and creates a UE network capability parameter profile, as illustrated by step (1), and stores the profile in DB 255 as a service profile 400 (FIG. 4). For example, the profile data may correspond to data indicated in one or more of fields 410, 420, 430, 440, 450, 460, 470, 480, and 490 included in one of records 400. Device controller 270 directs SCEF/NEF 265 to set parameter change flag 445 (e.g., "true") to indicate that one or more parameter values have been designated for UE 110 during account setup, as illustrated in step (2). UE 110 boots up with a default, statically-configured non-IP admin APN stored, for example, in a subscriber identification module (SIM) or other type of card or memory to be executed by UE 110, as indicated in step (3). The non-IP admin APN may be released after a predetermined amount of time spent idle by SCEF/NEF 265.

UE 110 and eNB/gNB 210 exchange messages to establish an RRC connection during which UE 110 may transmit a non-access stratum (NAS) attach request (Attach Request), as illustrated by step (4). In one embodiment, the Attach Request may include a PSM and/or an eDRX information element (IE) for support of the PSM and/or eDRX services.

The IE may include one or more timer values. In response to receiving the Attach Request, eNB/gNB 210 transmits an Attach Request to MME/AMF 220, as illustrated by step (5) (Attach Request). The Attach Request includes an IMSI or other identifier of UE 110, and a non-IP Packet Data Network (PDN) connectivity request.

After an RRC connection is established, an authentication procedure is performed, as illustrated in step (6). The authentication messaging may include an International Mobile Equipment Identity (IMEI) or other identifier of UE 110. Messages may be exchanged between MME/AMF 220 and HSS/UDM 250. As illustrated, MME/AMF 220 and HSS/UDM 250 may exchange messages (update location). For example, MME/AMF 220 may transmit an update location request (ULR) to HSS/UDM 250. Dependent on a result of the authentication procedure, MME/AMF 220 may determine whether or not to continue with the attachment procedure. According to this exemplary scenario, it may be assumed that MME/AMF 220 decides to continue with the attachment procedure, as illustrated in step (7).

In step (8), MME/AMF 220 generates and transmits a connection management request that identifies UE 110, the non-IP admin APN, and/or a bearer ID, to SCEF/NEF 265, for example, via a T6a connection. As illustrated in step (9), MME/AMF 220 generates and transmits an Attach Accept to eNB/gNB 210. In response to receiving the Attach Response, eNB/gNB 210 generates and transmits an Attach Response to UE 110. In step (10), HSS/UDM 250 and SCEF/NEF 265 exchange messages identifying the non-IP admin APN and matching UE 110 to a subscriber account, based on a subscriber network service attributes (e.g., APN IDs) stored in HSS/UDM 250. Based on the account matched and the parameter change flag in field 445, device controller 270, SCEF/NEF 265 triggers a UE service profile download by device controller 270 from DB 255, as illustrated in step (11).

In response to the trigger, device controller 270 generates and transmits, over the non-IP admin PDN connection, an MT TDR, bootstrap-request trigger, for executing network-capability-obj, as illustrated in step (12). In response to the bootstrap-request trigger, UE 110 generates and transmits to SCEF/NEF 265, over the non-IP admin PDN connection, an MO ODR, bootstrap-request, as illustrated in step (13). SCEF/NEF 265 routes the bootstrap request to device controller 270 based on the destination port included in the request. In response to the bootstrap-request, device controller 270 generates and transmits, over the non-IP admin PDN connection, an MT TDR, for writing the UE network capability parameters, as illustrated in step (14). In response, UE 110 may provision PSM and/or eDRX based on the parameter values. As illustrated in step (15), UE 110 generates and transmits to SCEF/NEF 265, over the non-IP admin PDN connection, an MO ODR, bootstrap-information transfer finished, as illustrated in step (15). UE 110 may, for example, use a configured port or RDS to address SCEF/NEF 265 and/or device controller 270. The PSM and/or eDRX parameter values are implemented by UE 110, subsequent to the provisioning, overriding any other parameters UE 110 may have been pre-configured with.

Although FIG. 6A illustrates exemplary messages and describes exemplary operations of the PSM and/or eDRX service that may occur during an attachment procedure, according to other embodiments and/or scenarios, the PSM and/or eDRX service may include messages and/or operations different from those illustrated and described in FIG. 6A.

Figure 6B:
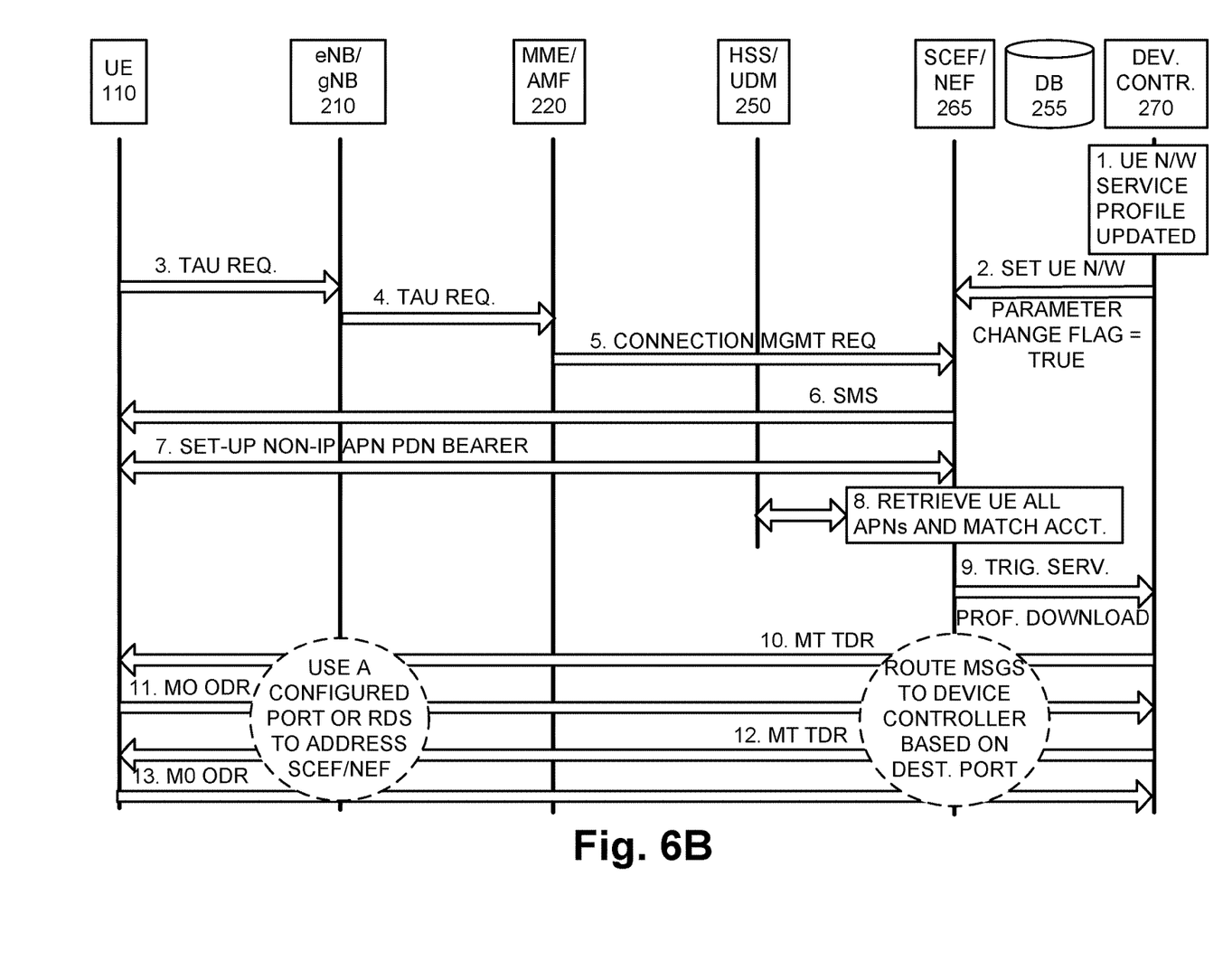
FIG. 6B is a diagram illustrating an exemplary process of the PSM and/or eDRX services included in an exemplary tracking area update procedure.

FIG. 6B is a diagram illustrating another exemplary process of the network service related to an exemplary TAU procedure involving UE 110, which is already attached, for example, per the procedure described above with respect to FIG. 6A. The messages illustrated and described are exemplary, and do not represent each and every message that may be exchanged during the TAU procedure or any other "wake-up" procedure. Additionally, a message may include other data (e.g., IEs, etc.) not specifically described herein. According to this exemplary scenario, assume that a triggering event has occurred, subsequent to the attachment described in relation to FIG. 6A, which causes UE 110 to initiate a TAU procedure.

As illustrated in FIG. 6B, in step (1), device controller 270 updates a service profile associated with a subscriber. For example, data indicated in one or more of fields 410, 420, 430, 440, 450, 460, 470, 480, and 490 included in one of records 400, is updated for UE 110 that is currently "asleep" in PSM (or "idle" in eDRX). Device controller 270 directs SCEF/NEF 265 to set parameter change flag 445 (e.g., "true") to indicate that one or more parameter values have been modified for UE 110 during account maintenance, etc., as illustrated in step (2). In step (3), UE 110 generates and transmits via eNB/gNB 210 a TAU request via an application non-IP PDN bearer.

In step (4), eNB/gNB 210 receives the TAU request, and in response, generates and transmits a TAU request to MME/AMF 220. In step (5), MME/AMF 220 generates and transmits a connection management request to SCEF/NEF 265, as previously described in relation to FIG. 6A. In step (6), in response to receiving the connection management request, SCEF/NEF 265 generates and transmits an SMS to UE 110. In step (7), in response to the SMS, UE 110 and SCEF/NEF 265 establish a non-IP admin PDN bearer. HSS/UDM 250, SCEF/NEF 265, device controller 270, and UE 110 perform operations illustrated in steps (8)-(13), similar to the operations illustrated in steps (10)-(15) as previously described in relation to FIG. 6A.

While FIG. 6B illustrates exemplary messages and describes exemplary operations of the UE network capability services that may occur during a TAU procedure, according to other embodiments and/or scenarios, the UE network capability services may include messages and/or operations different from those illustrated and described in FIG. 6B.

Figure 7:
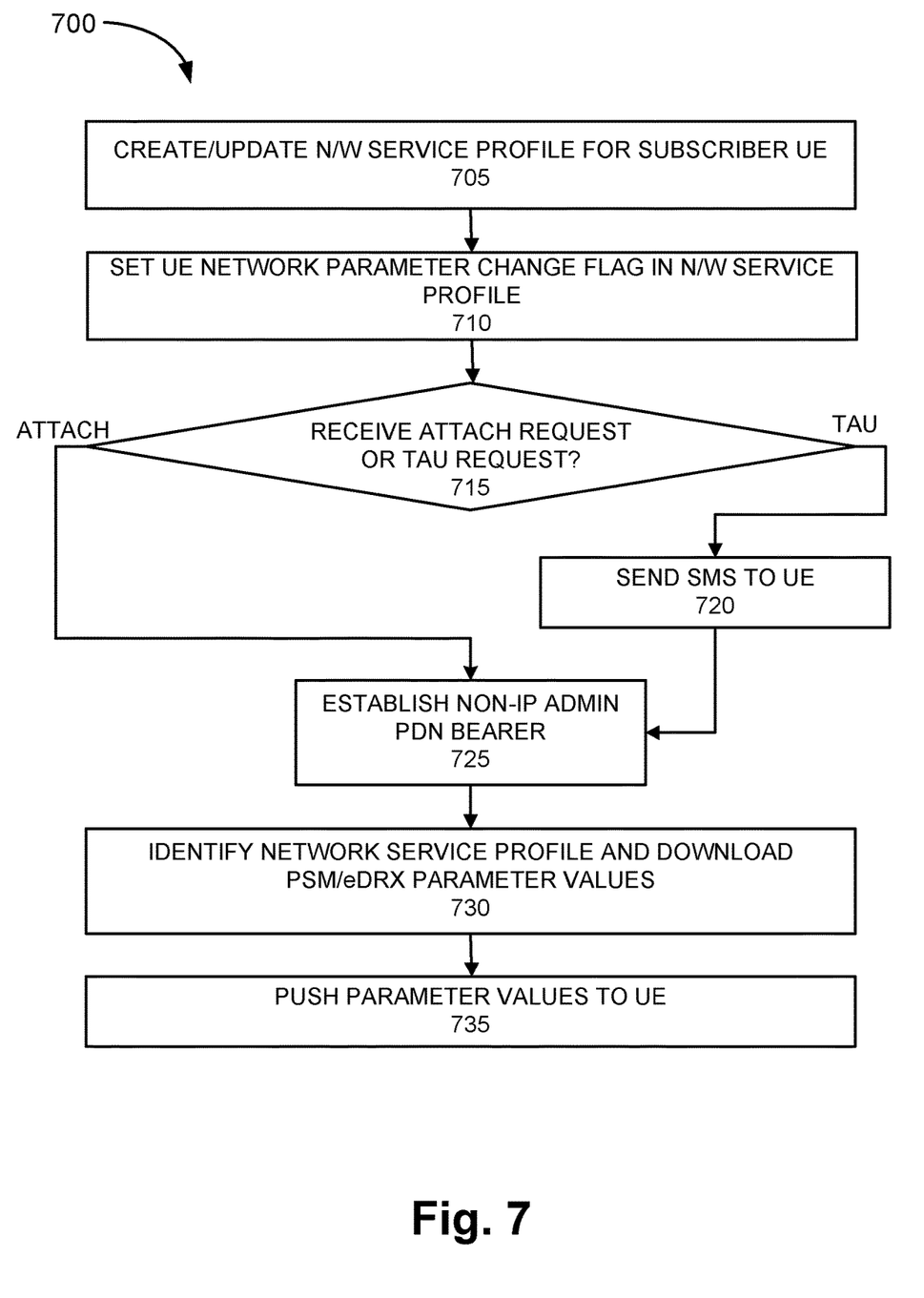
FIG. 7 is a flow diagram illustrating an exemplary process of an exemplary embodiment of the eDRX service.

FIG. 7 is a flow diagram illustrating an exemplary process 700 of an exemplary embodiment of the network service. Process 700 is directed to the process previously described with respect to FIGS. 6A and 6B, as well as elsewhere in the description. According to an exemplary embodiment, device controller 270 performs the steps of process 700. According to other exemplary embodiments, another type of network device (e.g., LWM2M OMA-DM 230, etc.) that manages PSM and/or eDRX support for UE 110 performs the steps of process 700. According to an exemplary embodiment, processor 310 executes software 320 to perform the steps illustrated in FIG. 7, as described herein.

According to an exemplary embodiment, the network device described in process 700 is SCEF/NEF 265. According to other exemplary embodiments, the network device is another type of network device (e.g., IEP 260, etc.) that stores subscription data and/or UE profile data pertaining to UE 110.

Referring to FIG. 7, block 705 of process 700, a network service profile is created during onboarding of a subscriber, or an existing network service profile is updated. For example, device controller 270 receives input from the subscriber, from a network service provider, from a network enablement platform, and/or from an application server associated with the network service profile. In block 710, in response to receiving the creation/update, a flag may be set in the network service profile indicating that a change has been made.

In block 715, a request is received from UE 110 via a RAN and a determination is made as to a type of the request. For example, an attach request may be received over a non-IP admin PDN, or a TAU request may be received over a non-IP application PDN. When it is determined that the request is a TAU request (block 715—TAU), an SMS message may be sent to UE 110 indicating to UE 110 that a non-IP admin APN be used to establish a PDN bearer (block 720). In response to the SMS, a non-IP admin connection may be established between UE 110 and SCEF/NEF 265, for example, as shown in block 725. When it is determined that the request is an attach request (block 715—ATTACH), a non-IP admin connection may be established between UE 110 and SCEF/NEF 265, for example, as shown in block 725, using a statically-allocated non-IP admin APN.

In block 730, device controller may identify the network service profile corresponding to UE 110, and download PSM values and/or DSM values. For example, device controller 270 may identify the subscriber's network profile based on the non-IP admin APN.

In block 735, in response to the parameter download, the UE network parameters may be pushed to UE 100. For example, device controller 270 may exchange messages as described in steps 12-15 shown in FIG. 6A.

Although FIG. 7 illustrates an exemplary process of the eDRX service, according to other embodiments, process 700 may include additional operations, fewer operations, and/or different operations than those illustrated in FIG. 7, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. For example, although the foregoing description of the authentication service may be implemented to authenticate IoT devices, the authentication service may be implemented to authenticate an end device other than an IoT device (e.g., a non-IoT device).

The words "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is intended to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," a "module," or an "element." The logic, the component, the module. or the element, may include, for example, hardware (e.g., processor 310, etc.), or a combination of hardware and software (e.g., processor 310 and software 320). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 310) of a computational device. A non-transitory storage medium includes one or more of the storage mediums described in relation to memory/storage 315.

To the extent the aforementioned embodiments collect, store or employ personal information provided by individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Collection, storage, and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
provisioning, by a network device associated with a wireless network, in a network-service profile associated with a network-service subscriber, at least one of a power saving mode (PSM) parameter or an extended discontinuous reception (eDRX) parameter for use by a first user device, wherein the network-service profile includes a parameter change flag field that is set to indicate that the at least one of the PSM parameter or the eDRX parameter have been provisioned;

receiving, by the network device, a network service-related request from the first user device via an administrative non-IP packet data network (PDN) bearer established using a statically-allocated non-IP administrative access point name (APN);

triggering, by the network device, a download of the network-service profile based on the parameter change flag field;

sending, by the network device via the PDN bearer and responsive to the triggering, a first mobile terminated trigger delivery request (MT-TDR) including a bootstrap request trigger, generated by the network device, to the first user device;

receiving, by the network device via the PDN bearer in response to the bootstrap request trigger, a first mobile originated originating delivery request (MO-ODR) bootstrap request;

sending, by the network device in response to receiving the MO-ODR bootstrap request, a second MT-TDR including the at least one of the PSM parameter or the eDRX parameter; and receiving, by the network device, a second MO-ODR bootstrap notification of completion of a transfer of the at least one of the PSM parameter or the eDRX parameter.

2. The method of claim 1, wherein the network service-related request includes a network attach request or a tracking area update (TAU) request.

3. The method of claim 1, further comprising:
releasing the PDN bearer after a predetermined amount of time for which the PDN bearer is idle after the second MO-ODR is received.

4. The method of claim 1, wherein the at least one of the PSM parameter or the eDRX parameter comprises multiple timer values for use in controlling data traffic over the wireless network via an application non-IP PDN bearer.

5. The method of claim 1, wherein the first user device is one of a group of multiple user devices, and wherein provisioning the at least one of the PSM parameter or the eDRX parameter comprises:
revising entries in the network-service profile associated with each of the respective multiple user devices.

6. The method of claim 1, wherein the first user device is one of a group of multiple user devices, and wherein provisioning the at least one of the PSM parameter or the eDRX parameter comprises:
selecting the at least one of the PSM parameter or the eDRX parameter based on a network traffic model associated with the multiple user devices.

7. The method of claim 6, wherein each of the multiple user devices comprises an Internet of Things (IoT) or a Machine-to-Machine (M2M) device.

8. The method of claim 1, wherein the network device comprises a network enablement platform associated with multiple application servers.

9. The method of claim 1, wherein the network device comprises a service capability exposure function (SCEF) device.

10. The method of claim 1, wherein the network device comprises a network exposure function (NEF) device.

11. A network device, comprising:
a communication interface configured to receive, via a wireless network, a network service-related request from a first user device, wherein the network service-related request is associated with obtaining network service for the first user device;
a processor configured to:
provision, in a network-service profile associated with a network-service subscriber, at least one of a power saving mode (PSM) parameter or an extended discontinuous reception (eDRX) parameter for use by the first user device, wherein the network-service profile includes a parameter change flag field that is set to indicate that the at least one of the PSM parameter or the eDRX parameter have been provisioned;
receive the network service-related request via an administrative non-IP packet data network (PDN) bearer established using a statically-allocated non-IP administrative access point name (APN);
trigger a download of the network-service profile based on the parameter change flag field;
send, via the PDN bearer and responsive to the triggering, a first mobile terminated trigger delivery request (MT-TDR) including a bootstrap request trigger, generated based on the APN, to the first user device;
receive, via the PDN bearer in response to the bootstrap request trigger, a first mobile originated originating delivery request (MO-ODR) bootstrap request;
send, in response to receiving the MO-ODR bootstrap request, a second MT-TDR including the at least one of the PSM parameter or the eDRX parameter; and
receive a second MO-ODR bootstrap notification of completion of a transfer of the at least one of the PSM parameter or the eDRX parameter.

12. The network device of claim 11, wherein the network service-related request includes a network attach request or a tracking area update (TAU) request.

13. The network device of claim 11, wherein the processor is further configured to:
release the PDN bearer after a predetermined amount of time for which the PDN bearer is idle after the second MO-ODR is received.

14. The network device of claim 11, wherein the at least one of the PSM parameter or the eDRX parameter comprises multiple timer values for use in controlling data traffic over the wireless network via an application non-IP PDN bearer.

15. The network device of claim 11, wherein the first user device is one of a group of multiple user devices, and wherein to provision the at least one of the PSM parameter or the eDRX parameter, the processor is further configured to:
revise entries in the network-service profile associated with each of the respective multiple user devices.

16. The network device of claim 15, wherein the multiple user devices each comprises an Internet of Things (IoT) or a Machine-to-Machine (M2M) device.

17. The network device of claim 11, wherein the network device comprises a network enablement platform associated with multiple application servers.

18. The network device of claim 11, wherein the network device comprises a service capability exposure function (SCEF) device.

19. The network device of claim 11, wherein the network device comprises a network exposure function (NEF) device.

20. A non-transitory storage medium storing instructions executable by a network device associated with a wireless network, wherein the instructions comprise instructions to cause the network device to:

provision, in a network-service profile associated with a network-service subscriber, at least one of a power saving mode (PSM) parameter or an extended discontinuous reception (eDRX) parameter for use by a first user device, wherein the network-service profile includes a parameter change flag field that is set to indicate that the at least one of the PSM parameter or the eDRX parameter have been provisioned;

receive a network service-related request from the first user device via an administrative non-IP packet data network (PDN) bearer established using a statically-allocated non-IP administrative access point name (APN);

trigger a download of the network-service profile based on the parameter change flag field;

generate, based on the APN and responsive to the triggering, a first mobile terminated trigger delivery request (MT-TDR) including a bootstrap request trigger;

send, via the PDN bearer, the first MT-TDR to the first user device;

receive, via the PDN bearer in response to the bootstrap request trigger, a first mobile originated originating delivery request (MO-ODR) bootstrap request;

send, in response to the bootstrap request, a second MT-TDR including the at least one of the PSM parameter or the eDRX parameter; and receive a second MO-ODR bootstrap notification of completion of a transfer of the at least one of the PSM parameter or the eDRX parameter.

* * * * *